I. N. JONES.
DRAWBAR CARRIER.
APPLICATION FILED FEB. 4, 1922.
1,438,831.
Patented Dec. 12, 1922.
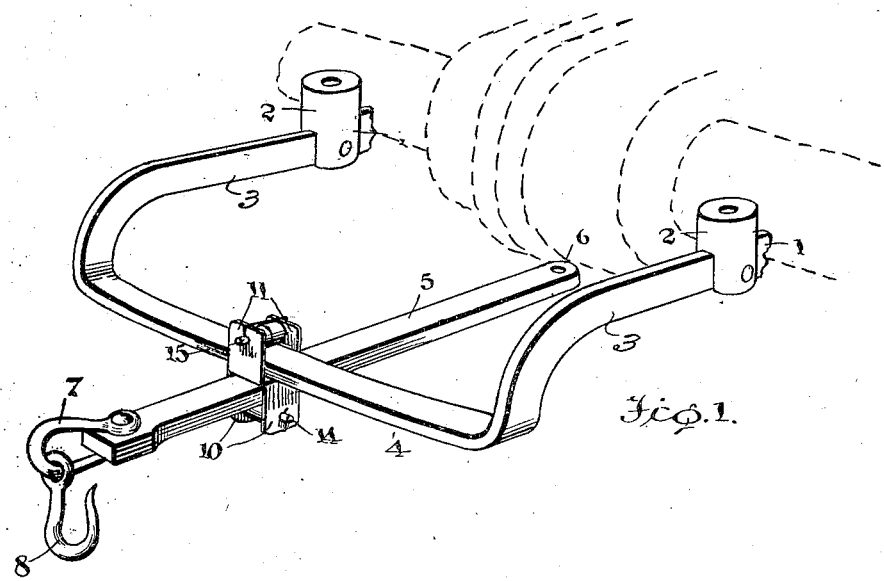
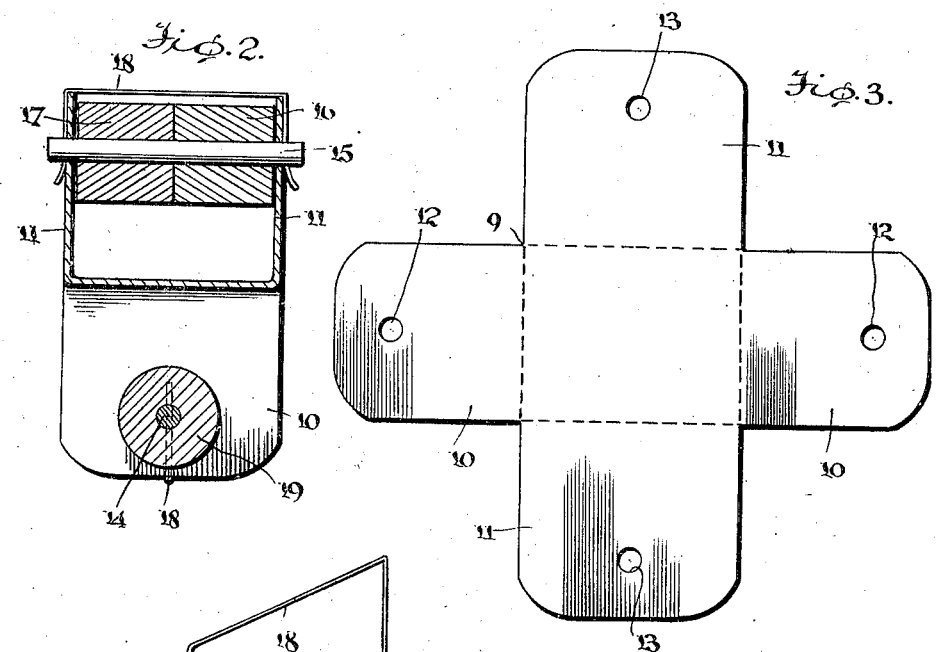
WITNESSES
INVENTOR
I. N. Jones,
BY
ATTORNEYS Patented Dec. 12, 1922.

1,438,831

UNITED STATES PATENT OFFICE.

ISAAC NELSON JONES, OF SANTA PAULA, CALIFORNIA.

DRAWBAR CARRIER.

Application filed February 4, 1922. Serial No. 534,150.

*To all whom it may concern:*

Be it known that I, ISAAC NELSON JONES, a citizen of the United States, and a resident of Santa Paula, in the county of Ventura and State of California, have invented certain new and useful Improvements in Drawbar Carriers, of which the following is a specification.

My invention relates to devices adapted to be attached to a tractor for movably supporting a draw bar connected with the tractor, and it consists in the combinations, constructions and arrangements herein described and claimed.

An object of my invention is to provide a carrier which is adapted to be attached to the frame of a tractor or like vehicle and to coact with a draw bar having a pivotal connection with the vehicle frame in such manner as to hold the draw bar out of contact with the vehicle frame while permitting of movement of the draw bar about its connection with the tractor frame into various angular relations to the longitudinal axis of the vehicle frame.

A further object of my invention is to provide a device of the character described which is simple in construction, adapted for application to tractor frames of conventional construction without any extensive changes, if any, in the ordinary construction of the latter being required, and not likely to get out of order easily.

Other objects and advantages will be apparent from the following description, and the novel features of the invention will be particularly outlined in the appended claims.

My invention is illustrated in the accompanying drawings, forming a part of this application, in which:—

Fig. 1 is a perspective view showing an embodiment of the invention applied to a tractor frame, Fig. 2 is an enlarged vertical section through a roller frame comprised in the device, Fig. 3 is a view showing the roller frame in developed form, and Fig. 4 is a perspective view of a cotter member which is also shown in Figs. 1 and 2.

Referring now to the drawings in which the same reference numerals are used to designate like parts throughout the several views, the numeral 1 indicates a tractor frame, only a portion of which is shown. A pair of spaced apart hangers 2—2 depend from the rear transverse member of the tractor frame.

A supporting member comprised in the device consists of spaced-apart parallel arm portions 3—3 pivotally attached at their inner ends to the hangers 2—2 and being bent downwardly adjacent to their outer ends and being connected by a flatwise disposed horizontal bar portion 4 which is integral with both of the arms 3—3.

The bar portion 4 is arcuate in form and the curvature thereof conforms to that of an arc struck by a draw bar 5 about its pivotal connection at 6 with the tractor frame. It is to be observed at this point that the supporting arms 3—3 are positioned at opposite sides of the draw bar 5 and at equal distances from the latter when the draw bar is positioned to extend parallel to or in coincidence with the longitudinal axis of the tractor frame, as illustrated in Fig. 1. The draw bar 5 carries at its outer end a clevis 7 provided with a hook 8 for attaching the draw bar to a trailer (not shown), such as an agricultural implement which is to be drawn by the tractor.

It is desirable that the draw bar 5 be capable of free movement within certain limits about the connection at 6 with the tractor frame and my invention contemplates the provision of means for guiding the draw bar in such movements in such manner as to preclude the possibility of the draw bar contacting the tractor frame when the tractor is guided to travel in a direction oblique to the longitudinal axis of the trailer. To this end, I provide a roller frame 9 which is preferably formed of a single flat metallic plate having pairs of oppositely extending wing portions 10—10 and 11—11, the axes of which intersect each other at right angles at the center of the plate. The wing portions of one pair are bent upwardly to extend at right angles to the plate and the wing portions of the other pair are bent downwardly into position to depend at right angles from the plate, as illustrated in Figs. 1 and 2. Alined openings 12—12 and 13—13 respectively are formed through the wing portions 10—10 and 11—11 respectively, adjacent to the outer ends of the latter and when the wing portions are bent in the manner described, the pairs of alined openings respectively receive the end portions of horizontally disposed shafts or pins 14 and 15 respectively, which are extended through the alined openings and have their ends projecting therebeyond. Two similar rollers 16 and 17 are shown as rotatably mounted upon the shaft or pin 15 between the portions 11—11 which now constitute upstanding flanges and the pin or shaft 15 is held against axial movement by the arms of a substantially U-shaped cotter member 18 which are projected through cotter openings in the opposite ends thereof. A roller 19 is rotatably disposed on the pin or shaft 14 between the portions 10—10 which now constitute depending flanges, whereby the roller 19 extends in a direction at right angles to that of the rollers 16 and 17.

One of the cotter members 18 is arranged with the arms thereof projected through cotter openings in the extremities of the pin or shaft 14 and holds the latter against movement relatively to the depending flanges 10—10.

From the foregoing description of the various parts of the device, the operation thereof may be readily understood. The pin or shaft 15 and the rollers mounted thereon, are placed in the position in which illustrated in Fig. 1 after the upstanding flanges 11—11 have been arranged to straddle the bar 4. The depending flanges 10—10 are then arranged in straddling relation to the draw bar 5 intermediately of the length of the latter and the pin or shaft 14 and the roller 19 supported thereon then mounted between the flanges 10—10 in the manner described.

It will thus be apparent that the bar portion 4 serves as a track and that the frame 9 together with the elements carried thereby, as described, comprise a carriage arranged to traverse the track and to support the draw bar intermediately for movement along the track. Since the bar portion 4 is curved as described, free movements of the draw bar within certain limits in a horizontal plane about its connection at 6, are permitted, and the connection of the draw bar at 6 and the connections of the arms 3—3 with the frame may be such as to permit of limited movements of the draw bar in a vertical plane about the connection at 6.

Obviously, my invention is susceptible of embodiment in forms varying in detail from that illustrated and I therefore consider as my own all such modifications and adaptations thereof as fairly fall within the scope of the appended claims.

I claim:—

1. The combination with a tractor having a draw bar pivotally attached thereto, of a supporting member comprising an arcuate bar portion and substantially parallel arm portions at the ends thereof, said arm portions extending substantially at right angles to a chord connecting the ends of said bar portion, means carried by the tractor for supporting the arm portions in such manner as to position the bar portion in a horizontal plane, a frame comprising a flat body having a pair of integral flange portions upstanding from opposite edges thereof and being arranged to straddle said bar portion and having a pair of integral flanges depending from opposite edges thereof at opposite sides of the draw bar, the planes of the second named flanges extending substantially at right angles to the planes of the first named flanges, a roller removably and rotatably mounted between the first flanges in position to have a rolling contact with the upper side of the bar portion, and a roller removably and rotatably mounted between the second named flanges in position to have a rolling contact with the under side of said draw bar.

2. In a device of the character described, a roller device comprising a frame consisting of a flat rectangular body having integral flanges upstanding from a pair of opposite edges thereof and other integral flanges depending from the other pair of opposite edges thereof, a shaft removably supported by said first named flanges at a determined distance above and with its axis substantially parallel to the plane of said body, a shaft removably supported by said depending flanges at a determined distance below and parallel to the plane of the body, and rollers mounted upon said shafts.

3. In a device of the character described, a roller device comprising a frame consisting of a flat rectangular body having integral flanges upstanding from a pair of opposite edges thereof and other integral flanges depending from the other pair of opposite edges thereof, a shaft removably supported by said first named flanges at a determined distance above and with its axis substantially parallel to the plane of said body, a shaft removably supported by said depending flanges at a determined distance below and parallel to the plane of the body, rollers mounted upon said shafts, and means for normally preventing the displacement of said shafts relatively to said flanges.

4. In a device of the character described, a roller device comprising a frame consisting of a flat rectangular body having integral flanges upstanding from a pair of opposite edges thereof and other integral flanges depending from the other pair of opposite edges thereof, a shaft removably supported by said first named flanges at a determined distance above and with its axis substantially parallel to the plane of said body, a shaft removably supported by said depending flanges at a determined distance below and parallel to the plane of the body, rollers mounted upon said shafts, each of said shafts being provided with parallel transverse openings therethrough adjacent to the opposite ends thereof, and a substantially U-shaped locking member for each shaft, each locking member including a web portion spanning the flanges supporting one of the shafts and arm portions engaging the transverse openings through the shaft.

ISAAC NELSON JONES.